(12) United States Patent
Zhang et al.

(10) Patent No.: US 11,749,424 B2
(45) Date of Patent: Sep. 5, 2023

(54) MANUFACTURING METHOD OF A HOISTING CABLE WITH SMALL DIAMETER, HIGH STRENGTH, AND HIGH FLEXIBILITY

(71) Applicant: Jilin University, Changchun (CN)

(72) Inventors: Nan Zhang, Changchun (CN); Hui Liu, Changchun (CN); Youhong Sun, Changchun (CN); Pavel Talalay, Changchun (CN); Ting Wang, Changchun (CN); Xiaopeng Fan, Changchun (CN); Bing Li, Changchun (CN); Rusheng Wang, Changchun (CN); Da Gong, Changchun (CN); Yunchen Liu, Changchun (CN); Yang Yang, Changchun (CN); Jialin Hong, Changchun (CN); An Liu, Changchun (CN); Yanji Chen, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 269 days.

(21) Appl. No.: 17/168,679

(22) Filed: Feb. 5, 2021

(65) Prior Publication Data

US 2021/0265081 A1 Aug. 26, 2021

(30) Foreign Application Priority Data

Feb. 21, 2020 (CN) .......................... 202010107087.8

(51) Int. Cl.
*H01B 7/18* (2006.01)
*H01B 7/04* (2006.01)
*H01B 13/34* (2006.01)
*H01B 13/14* (2006.01)

(52) U.S. Cl.
CPC ............. *H01B 7/1865* (2013.01); *H01B 7/04* (2013.01); *H01B 13/14* (2013.01); *H01B 13/34* (2013.01); *Y10T 29/49117* (2015.01)

(58) Field of Classification Search
CPC ........ H01B 13/02; H01B 13/24; H01B 13/00; H01B 7/04; H01B 7/2806; H01B 13/06; H01B 7/18; H01B 7/29; H01B 11/1869; H01B 13/0162; H01B 13/0165; H01B 13/14; H01B 11/1834; H01B 11/1878;
(Continued)

(56) References Cited

U.S. PATENT DOCUMENTS 5,304,739 A * 4/1994 Klug ...................... H01B 7/292
174/102 R
10,763,012 B2 * 9/2020 Watanabe ............... H01B 11/20

\* cited by examiner

*Primary Examiner* — Thiem D Phan
(74) *Attorney, Agent, or Firm* — M&B IP Analysts, LLC

(57) ABSTRACT

The present disclosure discloses a hoisting cable with small diameter, high strength, and high flexibility, including an inner conductive core, an insulating layer, an outer conductive wire layer, a tensile layer, and an outer protective layer. The insulating layer is located at an outer side of the inner conductive core and provides insulation between the inner and outer conductors; the outer conductive wire layer is located at an outer side of the insulating layer; the tensile layer is located at an outer side of the outer conductive wire layer; and the outer protective layer is located at an outer side of the tensile layer. The high tensile strength can ensure the safety of hoisting operations, and the small diameter, small bend radius, and high flexibility can ensure the minimization design and the large rope capacity of a winch.

1 Claim, 1 Drawing Sheet

(58) Field of Classification Search
CPC .. H01B 13/141; H01B 7/0225; H01B 7/1865; H01B 13/34; Y10T 29/49117
USPC .......................... 29/825, 729, 745, 828, 868
See application file for complete search history.

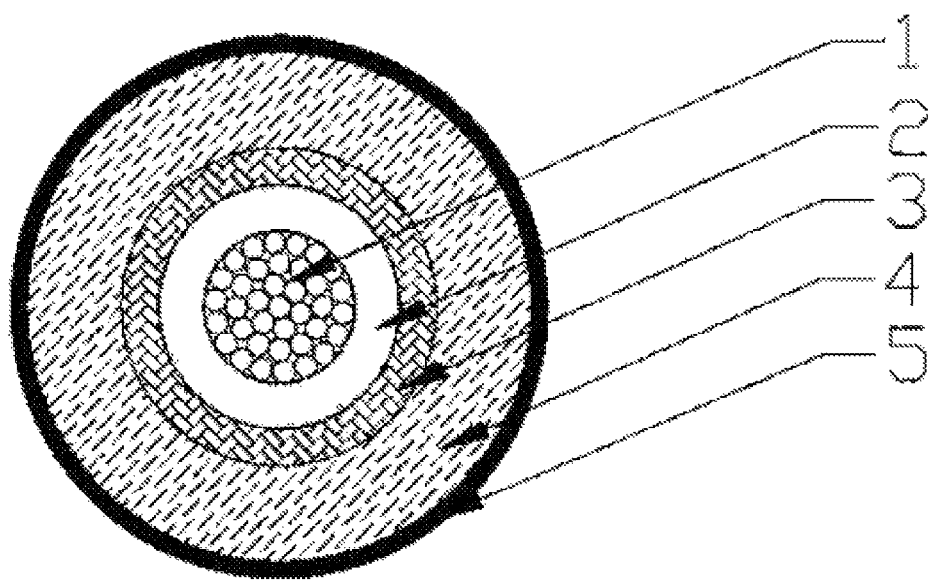

MANUFACTURING METHOD OF A HOISTING CABLE WITH SMALL DIAMETER, HIGH STRENGTH, AND HIGH FLEXIBILITY

The present application claims priority to the Chinese Patent Application No. 202010107087.8, filed to the China National Intellectual Property Administration (CNIPA) on Feb. 21, 2020 and entitled "HOISTING CABLE WITH SMALL DIAMETER, HIGH STRENGTH, AND HIGH FLEXIBILITY", which is incorporated herein by reference in its entirety.

TECHNICAL FIELD

The present disclosure relates to a hoisting cable with small diameter, high tensile strength, small bend diameter, and high flexibility, and belongs to the field of electrical technology and equipment.

BACKGROUND

A cable is used as a power supply cable in general working conditions, but in some special working conditions where electrical equipment or engineering equipment needs to be hoisted, a cable must be used not only as a power supply cable for the hoisted equipment, but also as a load-bearing cable, which requires the cable to have a relatively-high tensile strength. Moreover, due to the up and down movement of hoisted equipment, a winch must be provided for the equipment, and in order to reduce the size of the equipment, the winch must be miniaturized, which requires the cable to have a small diameter and a minimum bend radius. Traditional cables are designed without consideration of high tensile strength, and even some cables are designed in consideration of tensile strength, but still have a tensile strength that cannot meet the requirements for hoisting large-mass equipment (>1,000 kg). In addition, traditional tensile cables have large diameters and bend radii, so that a winch cannot be miniaturized. Therefore, according to actual engineering needs, a design plan for a novel hoisting cable with small diameter, high tensile strength, small bend radius, and high flexibility is proposed to solve the problems mentioned above.

SUMMARY

The present disclosure is intended to provide a hoisting cable with small diameter, high strength, and high flexibility. The cable of the present disclosure have characteristics of small diameter (≤5.2 mm), small bend radius (17 mm to 20 mm), and large breaking force (>15 kN).

The hoisting cable with small diameter, high strength, and high flexibility includes an inner conductive core, an insulating layer, an outer conductive wire layer, a tensile layer, and an outer protective layer.

The inner conductive core is a copper wire bundle consisting of 37 copper wires with a diameter of 0.21 mm, which has a cumulative outer diameter of 1.4±0.05 mm after twisting.

The insulating layer is located at an outer side of the inner conductive core and provides insulation between the inner and outer conductors. The insulating layer is made of fluorinated ethylene-propylene (FEP) that has prominent insulating properties and can be used for high-voltage insulation at a small thickness, allowing the cable to have a minimum overall diameter, high flexibility, and greatly-reduced bend radius. The insulating layer has a thickness of 0.45 mm and a cumulative outer diameter of 2.3±0.05 mm.

The outer conductive wire layer is located at an outer side of the insulating layer. The outer conductive wire layer is a mesh woven from copper wires in the following manner: 16 spindles×4 wires/spindle×copper wire diameter of 0.18 mm, and the copper wire-woven layer has a thickness of 0.35 mm and a cumulative outer diameter of 3.0±0.1 mm.

The tensile layer is located at an outer side of the outer conductive wire layer and is a mesh woven from Vectran aramid fibers. Vectran aramid fibers provide a large breaking force, which greatly increases the tensile strength of the cable. The mesh woven allows the tensile layer to be evenly stressed and the cable to have a reduced diameter. The Vectran aramid fibers are woven in the following manner: 24 spindles×2 strands/spindle, and the aramid fiber-woven layer has a thickness of 0.95 mm and a cumulative outer diameter of 4.9±0.1 mm.

The outer protective layer is located at an outer side of the tensile layer. The outer protective layer is formed by wrapping with a polyimide film through fusion welding and coating with silica gel through impregnation, which is provided to protect the cable and increase the flexibility of the cable. The outer protective layer has a thickness of 0.1 mm and a cumulative outer diameter of 5.1±0.1 mm.

Optionally:

The inner conductive core is a silver-plated copper wire bundle consisting of 37 silver-plated copper wires with a diameter of 0.21 mm, which has a cumulative outer diameter of 1.4±0.05 mm after twisting.

The insulating layer is made of FEP and has a thickness of 0.45 mm and a cumulative outer diameter of 2.3±0.05 mm.

The outer conductive wire layer is a mesh woven from silver-plated copper wires in the following manner: 16 spindles×4 wires/spindle×silver-plated copper wire diameter of 0.18 mm, and the silver-plated copper wire-woven layer has a thickness of 0.35 mm and a cumulative outer diameter of 3.0±0.1 mm.

The tensile layer is a mesh woven from Vectran aramid fibers in the following manner: 24 spindles×2 strands/spindle, and the aramid fiber-woven layer has a thickness of 0.95 mm and a cumulative outer diameter of 4.9±0.1 mm.

The outer protective layer is formed by wrapping with a polyimide film through fusion welding and coating with tetrafluoroethylene-hexafluoropropylene copolymer, and the outer protective layer has a thickness of 0.1 mm and a cumulative outer diameter of 5.1±0.1 mm.

The present disclosure also provides a manufacturing method of the hoisting cable with small diameter, high strength, and high flexibility, including the following steps:

normally twisting 37 silver-plated copper wires in a layered form to obtain the inner conductive core, where, specifically: 1 silver-plated copper wire is arranged as a central wire in a first structural layer; 6 silver-plated copper wires are arranged in a second structural layer, and normal twisting is conducted in a left direction; 12 silver-plated copper wires are arranged in a third structural layer, and normal twisting is conducted in a right direction; and 18 silver-plated copper wires are arranged in a fourth structural layer, and normal twisting is conducted in the left direction;

preheating the obtained inner conductive core, extruding FEP with a high-temperature extruder, coating extruded FEP on a preheated inner conductive core, and cooling with hot water at 80° C. to 90° C. to obtain the insulating layer;

weaving silver-plated copper wires outside the obtained insulating layer in the following manner: 16 spindles×4 wires×diameter of 0.18 mm to obtain the outer conductive wire layer, where, the silver-plated copper wires are woven at a weaving pitch of 21 mm to 25 mm;

weaving a Vectran aramid fiber mesh outside the obtained outer conductive wire layer to obtain the tensile layer, where, specifically: the aramid fibers are woven at a constant tension, a weaving pitch of 80 mm to 90 mm, and a weaving angle of 10° in the following manner: 24 spindles×2 strands/spindle; and wrapping the obtained tensile layer with a polyimide film coated with tetrafluoroethylene-hexafluoropropylene copolymer, and after the wrapping is completed, fusing the polyimide film at 400° C. and cooling to obtain the outer protective layer.

The hoisting cable has the characteristics of small diameter, high flexibility, small bend radius, high tensile strength, and so on.

Beneficial Effects of the Present Disclosure

The cable of the present disclosure can be used as a power supply cable and can also be used as a load-bearing cable in large-mass hoisting operations. The high tensile strength can ensure the safety of hoisting operations, and the small diameter, small bend radius, and high flexibility can ensure the minimization design and the large rope capacity of a winch. Therefore, the cable of the present disclosure shows more significant technological advantages than a traditional cable in the simultaneous power supply and hoisting operations for electrical equipment.

BRIEF DESCRIPTION OF DRAWINGS

FIG. 1 is a cross-sectional view of the present disclosure.

In the FIGURE, 1 represents an inner conductive core, 2 represents an insulating layer, 3 represents an outer conductive wire layer, 4 represents a tensile layer, and 5 represents an outer protective layer.

DETAILED DESCRIPTION

As shown in FIG. 1, a hoisting cable with small diameter, high strength, and high flexibility includes an inner conductive core 1, an insulating layer 2, an outer conductive wire layer 3, a tensile layer 4, and an outer protective layer 5. The insulating layer 2 is located at an outer side of the inner conductive core 1 and provides insulation between the inner and outer conductors; the outer conductive wire layer 3 is located at an outer side of the insulating layer 2; the tensile layer 4 is located at an outer side of the outer conductive wire layer 3; and the outer protective layer 5 is located at an outer side of the tensile layer 4.

The inner conductive core 1 is a wire bundle consisting of 37 copper wires with a diameter of 0.21 mm, which has a conductor cross-sectional area of 1.28 mm$^2$, and a current carrying capacity of 15 A and a resistance≤14 Ω/km at room temperature.

The insulating layer 2 is made of FEP that can maintain prominent insulating properties at a small thickness and has excellent performance at low and high temperatures. The insulating layer has a thickness of 0.45 mm and a working withstand voltage of 2,500 V AC and will not occur electric breakdown at a test voltage of 7,500V AC within 5 min. Moreover, the material has excellent flexibility and bending performance and thus can withstand high pressure for a long time.

The outer conductor 3 is a mesh conductor structure woven from silver-plated copper wires in the following manner: 16 spindles, 4 wires/spindle, and silver-plated copper wire diameter of 0.18 mm. The outer conductor has a conductor cross-sectional area of 1.63 mm$^2$, and a current carrying capacity>15 A and a resistance<14 Ω/km at room temperature.

The tensile layer 4 is a mesh woven from Vectran aramid fibers in the following manner: 24 spindles×2 strands/spindle, and the aramid fiber-woven layer has a thickness of 0.95 mm and an effective tensile strength (breaking force) ≥15 kN. The mesh weaving allows the tensile layer to be evenly stressed and can effectively reduce cable diameter.

The outer protective layer 5 is formed by wrapping with a polyimide film through fusion welding and coating with silica gel through impregnation, which is provided to protect the cable and increase the flexibility of the cable, enabling a bend radius of about 17 mm to 20 mm. The outer protective layer has a thickness of 0.1 mm. The hoisting cable has an overall outer diameter of 5.1±0.1 mm.

In a specific example:

The inner conductive core (1) was a silver-plated copper wire bundle consisting of 37 silver-plated copper wires with a diameter of 0.21 mm, which had a cumulative outer diameter of 1.4±0.05 mm after twisting.

The insulating layer (2) was made of FEP and had a thickness of 0.45 mm and a cumulative outer diameter of 2.3±0.05 mm.

The outer conductive wire layer (3) was a mesh woven from silver-plated copper wires in the following manner: 16 spindles×4 wires/spindle×silver-plated copper wire diameter of 0.18 mm, and the silver-plated copper wire-woven layer had a thickness of 0.35 mm and a cumulative outer diameter of 3.0±0.1 mm.

The tensile layer (4) was a mesh woven from Vectran aramid fibers in the following manner: 24 spindles×2 strands/spindle, and the aramid fiber-woven layer had a thickness of 0.95 mm and a cumulative outer diameter of 4.9±0.1 mm.

The outer protective layer (5) was formed by wrapping with a polyimide film through fusion welding and coating with tetrafluoroethylene-hexafluoropropylene copolymer, and the outer protective layer had a thickness of 0.1 mm and a cumulative outer diameter of 5.1±0.1 mm.

In this example, a manufacturing method of the hoisting cable with small diameter, high strength, and high flexibility was provided, including:

Manufacturing of the inner conductive core 1. Specifically, 37 silver-plated copper wires were manufactured to normal twisting in a layered form, that is, 1 silver-plated copper wire was arranged in a first layer, 6 silver-plated copper wires were arranged in a second layer, 12 silver-plated copper wires were arranged in a third layer, and 18 silver-plated copper wires were arranged in a fourth layer. The 1 silver-plated copper wire in the first layer served as a central wire, which was subjected to no twisting and thus had no directionality. Starting from the second layer, the left, right, and left twisting directions were determined sequentially to meet requirements of torsion resistance. In the twisting, the artificial diamond twisting mold was used as a mold to avoid scratches and scrapes on the conductor. The wire breakage must be avoided during manufacturing to avoid burrs, which may affect the subsequent insulating properties.

Manufacturing of the insulating layer 2. Specifically, the inner conductive core 1 was preheated first, that is, a conductor preheater was added before a high-temperature extruder head for preheating. Because a hot conductive core allows better adhesion with the insulating layer than a cold conductive core, and can promote the release of molecular crystal stress generated when the fluoroplastic is rapidly cooled. FEP was extruded with a high-temperature extruder at a high temperature, that is, FEP was fused into a fusant in a screw cylinder of the high-temperature extruder by heating, delivered to a mold mouth through the shearing and pushing by a screw of the high-temperature extruder, coated on the preheated inner conductive core 1, and then cooled with hot water at 80° C. to 90° C. A core with a manufacture length is not allowed to have spark breakdown points. Therefore, a high-frequency 7,500V spark test must be carried out for the core to screen out the local defect locations with poor insulation. Finally, the insulating layer 2 was obtained.

Manufacturing of the outer conductive wire layer 3. Specifically, the outer conductive wire layer 3 was woven outside the insulating layer 2 from silver-plated copper wires at a weaving pitch of 21 mm to 25 mm in the following manner: 16 spindles×4 wires×diameter of 0.18 mm, to ensure that the outer conductive wire layer had a cross-sectional area of 1.63 mm$^2$, an effective cross-sectional area of 1.5 mm$^2$, and a resistance of 13 Ω/km. During the weaving process, the weaving splicing point must be avoided on the manufacture length to avoid metal burrs on the outer conductive wire layer 3, which affects the withstanding voltage of a cable. If a broken spindle is found during the weaving process, weaving should be stopped, all woven parts of the outer conductor should be stripped, and weaving should be restarted.

Manufacturing of the tensile layer 4. Specifically, the tensile layer was woven outside the outer conductive wire layer 3 from Vectran aramid fibers. Vectran aramid fibers provide a large breaking force, which greatly increases the tensile strength of the cable. The mesh weaving allows the tensile layer to be evenly stressed and the cable to have a reduced diameter. The aramid fibers were woven in the following manner: 24 spindles×2 strands/spindle, and tensions for aramid fibers at all spindles were controlled to be consistent, so as to avoid distortion due to inconsistent tightness values. Specifically, the tension for aramid fibers at each spindle could be tested with a tension sensor to ensure consistency. During the weaving process, aramid fibers are not allowed to be transferred to another spindle, so as not to compromise the tensile capacity. The aramid fiber mesh was woven at a weaving pitch of 80 mm to 90 mm and a weaving angle of about 10°, which not only ensures reliable wrapping, but also maximizes the tensile strength utilization of aramid fiber materials.

Manufacturing of the outer protective layer 5. Specifically, a polyimide film coated with tetrafluoroethylene-hexafluoropropylene copolymer was wrapped outside the tensile layer 4, and then high-temperature fusion was carried out after the wrapping. In the high-temperature fusion, the tetrafluoroethylene-hexafluoropropylene copolymer materials coated on both sides of the polyimide film wrapped were fused and bonded together at 400° C., that is, coated materials were fused due to high-temperature sintering and then cooled to form a dense polyimide protective layer, namely, the outer protective layer 5, at which point, manufacturing of the hoisting cable with small diameter, high strength, and high flexibility was completed.

What is claimed is:

1. A manufacturing method of a hoisting cable with small diameter, high strength, and high flexibility, comprising:

normally twisting 37 silver-plated copper wires in a layered form to obtain an inner conductive core, wherein, 1 silver-plated copper wire is arranged as a central wire in a first structural layer; 6 silver-plated copper wires are arranged in a second structural layer, and normal twisting is conducted in a left direction; 12 silver-plated copper wires are arranged in a third structural layer, and normal twisting is conducted in a right direction; and 18 silver-plated copper wires are arranged in a fourth structural layer, and normal twisting is conducted in the left direction;

preheating the obtained inner conductive core, extruding FEP with a high-temperature extruder, coating extruded FEP on a preheated inner conductive core, and cooling with hot water at 80° C. to 90° C. to obtain an insulating layer;

weaving silver-plated copper wires outside the obtained insulating layer in the following manner: 16 spindles×4 wires/spindle×diameter of 0.18 mm to obtain an outer conductive wire layer (3), wherein, the silver-plated copper wires are woven at a weaving pitch of 21 mm to 25 mm;

weaving a Vectran aramid fiber mesh outside the obtained outer conductive wire layer to obtain a tensile layer (4), wherein, aramid fibers are woven at a constant tension, a weaving pitch of 80 mm to 90 mm, and a weaving angle of 10° in the following manner: 24 spindles×2 strands/spindle; and wrapping the obtained tensile layer with a polyimide film coated with tetrafluoroethylene-hexafluoropropylene copolymer, and after the wrapping is completed, fusing the polyimide film at 400° C. and cooling to obtain an outer protective layer.

\* \* \* \* \*